(12) United States Patent
Nakayama

(10) Patent No.: US 11,723,124 B2
(45) Date of Patent: Aug. 8, 2023

(54) LIGHT-EMITTING ELEMENT DRIVING DEVICE

(71) Applicant: Rohm Co., Ltd., Kyoto (JP)

(72) Inventor: Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 113 days.

(21) Appl. No.: 17/432,130

(22) PCT Filed: Feb. 26, 2020

(86) PCT No.: PCT/JP2020/007714
§ 371 (c)(1),
(2) Date: Aug. 19, 2021

(87) PCT Pub. No.: WO2020/195478
PCT Pub. Date: Oct. 1, 2020

(65) Prior Publication Data
US 2022/0159800 A1    May 19, 2022

(30) Foreign Application Priority Data

Mar. 27, 2019  (JP) .................. 2019-061318

(51) Int. Cl.
*H05B 45/10* (2020.01)
*H05B 45/46* (2020.01)
(Continued)

(52) U.S. Cl.
CPC .......... *H05B 45/10* (2020.01); *H05B 45/345* (2020.01); *H05B 45/3725* (2020.01); *H05B 45/46* (2020.01); *B60Q 1/1415* (2013.01)

(58) Field of Classification Search
CPC ...... H05B 45/10; H05B 45/30; H05B 45/345; H05B 45/3725; H05B 45/46; H05B 47/10; B60Q 1/1415
See application file for complete search history.

(56) References Cited

U.S. PATENT DOCUMENTS

2005/0007085 A1   1/2005  Murakami
2007/0262796 A1   11/2007 Murakami
(Continued)

FOREIGN PATENT DOCUMENTS

CN   102238779    11/2011
CN   102316628    1/2012
(Continued)

OTHER PUBLICATIONS

PCT International Search Report in International Appln. No. PCT/JP2020/007714, dated Apr. 21, 2020, 4 pages (with English Translation).

*Primary Examiner* — Jimmy T Vu
(74) *Attorney, Agent, or Firm* — Fish & Richardson P.C.

(57) ABSTRACT

A light-emitting element driving device includes a setter and first to nth constant current sources. An ith series circuit is a series circuit of an ith light-emitting element string and the ith constant current source. The ith constant current source is turned on and off with a delay from an ith dimming signal indicating either lighting or extinction of the ith light-emitting element string. The setter has a mode in which it sets the target value of an output voltage fed to the respective anodes of the first to nth series circuits at a value at which the jth light-emitting element string can be lit during the period from a first time point that a jth dimming signal switches from indicating extinction of the jth light-emitting element string to indicating its lighting to a second time point that the jth constant current source switches from off to on.

10 Claims, 8 Drawing Sheets

(51) Int. Cl.
  *H05B 45/345*  (2020.01)
  *H05B 45/3725*  (2020.01)
  *B60Q 1/14*  (2006.01)

(56) References Cited

U.S. PATENT DOCUMENTS

| | | |
|---|---|---|
| 2009/0201002 A1 | 8/2009 | Murakami |
| 2010/0220049 A1 | 9/2010 | Murakami |
| 2011/0181582 A1 | 7/2011 | Murakami |
| 2011/0260617 A1 | 10/2011 | Tanaka |
| 2011/0273104 A1 | 11/2011 | Uchimoto et al. |
| 2013/0314000 A1 | 11/2013 | Murakami |
| 2014/0346958 A1 | 11/2014 | Murakami |
| 2016/0135262 A1 | 5/2016 | Murakami |
| 2017/0063226 A1 | 3/2017 | Murakami |
| 2018/0212518 A1 | 7/2018 | Murakami |
| 2019/0013730 A1 | 1/2019 | Murakami |
| 2019/0334437 A1 * | 10/2019 | Murakami ............. H05B 47/10 |
| 2020/0321863 A1 | 10/2020 | Murakami |

FOREIGN PATENT DOCUMENTS

| | | |
|---|---|---|
| EP | 2381741 | 10/2011 |
| JP | 2005033853 | 2/2005 |
| JP | 2007242886 | 9/2007 |
| JP | 2011233261 | 11/2011 |
| JP | 2011233264 | 11/2011 |
| KR | 20110118573 | 10/2011 |
| TW | 201215221 | 4/2012 |

\* cited by examiner

LIGHT-EMITTING ELEMENT DRIVING DEVICE

TECHNICAL FIELD

The present invention relates to light-emitting element driving devices.

BACKGROUND ART

There have been developed various types of light-emitting element driving devices for driving light-emitting elements such as LEDs (light-emitting diodes).

Known LED driving devices include constant-voltage LED driving devices (see, for example, Patent Document 1 identified below). A constant-voltage LED driving device keeps constant its output voltage that is fed to the anode of an LED string comprising at least one LED, while passing a constant current through the LED string from a constant current source that is connected to the cathode of the LED string. The constant value of the output voltage is set so as to be higher than the sum of the forward voltage across the LED string and the voltage drop across the constant current source even with consideration given to the forward-voltage variations and temperature characteristics of the LED string.

It is thus possible to light the LED string with desired luminance reliably.

Inconveniently, a constant-voltage LED driving device has the drawback of high heat generation in the constant current source when the forward voltage across the LED string is comparatively low.

One example of a light-emitting device that includes a known LED driving device that can reduce heat generation by controlling the output voltage is shown in FIG. 8. The light-emitting device 200 shown in FIG. 8 has a plurality of LED strings Z1 to Zn connected to the output terminal of a DC-DC converter CNV1.

In the light-emitting device 200 shown in FIG. 8, the DC-DC converter CNV1 is controlled by feeding back to it a feedback signal FB generated by a comparator COM1 such that the lowest voltage among the respective cathode voltages of the plurality of LED strings Z1 to Zn remains equal to or higher than a predetermined voltage. If the cathode voltage of an LED string becomes equal to or lower than the product of the desired current multiplied by the combined resistance of the on-state resistance of a transistor connected in series with the LED string to serve as a current source and a current sense resistor connected in series with the transistor, the desired current can no longer be passed through the LED string.

Patent Document 2 identified below discloses a device similar to the light-emitting device 200 shown in FIG. 8.

CITATION LIST

Patent Literature

Patent Document 1: Japanese unexamined patent application publication No. 2007-242886 (FIG. 10)
Patent Document 2: Japanese unexamined patent application publication No. 2005-33853 (FIG. 5)

SUMMARY OF INVENTION

Technical Problem

When the light-emitting device 200 shown in FIG. 8 is used as a backlight capable of local dimming control for use in liquid crystal display devices, a vehicle-mounted lamp with illumination capabilities, or the like, it is necessary to turn on and off the plurality of LED strings Z1 to Zn individually based on dimming signals PWM1 to PWMn which are separate signals. For example, with the LED string Z1 alone on, an attempt to turn the LED string Zn from off to on succeeds, if the forward voltage across the LED string Zn is equal to or lower than the forward voltage across the LED string Z1, in turning on the LED string Zn without problem, but fails, if the forward voltage across the LED string Zn is higher than the forward voltage across the LED string Z1, to turn on the LED string Zn.

Against the background discussed above, an object of the present invention is to provide a light-emitting element driving device that can operate with reduced heat generation and that in addition can prevent a light-emitting element from failing to be lit due to its being fed with an insufficient voltage.

Solution to Problem

According to one aspect of what is disclosed herein, a light-emitting element driving device includes: a setter configured to set the target value for the output voltage that is fed from a power supply circuit configured to covert an input voltage to the output voltage to the respective anodes of first to nth series circuits (where n is a natural number of 2 or more); and first to nth constant current sources. The ith series circuit (where i is a natural number of n or less) is a series circuit composed of an ith light-emitting element string and the ith constant current source. The ith constant current source is configured to be turned on and off with a delay from an ith dimming signal that indicates either lighting or extinction of the ith light-emitting element string. The setter is configured to have: a first mode in which the setter sets the target value for the output voltage such that, in a configuration where the cathode of the ith light-emitting element string is connectable to the anode of the ith constant current source, the lowest voltage among the respective cathode voltages of the first to nth light-emitting element strings equals a predetermined value and, in a configuration where the anode of the ith light-emitting element string is connectable to the cathode of the ith constant current source, the highest voltage among the respective anode voltages of the first to nth light-emitting element strings equals a predetermined value; and a second mode in which the setter sets the target value for the output voltage at a value at which the jth light-emitting element string (where j is a natural number of n of less) can be lit during the period from a first time point at which a jth dimming signal switches from indicating extinction of the jth light-emitting element string to indicating its lighting to a second time point at which the jth constant current source switches from off to on. (A first configuration.)

In the light-emitting element driving device of the first configuration described above, the setter may be configured such that, when the first time point comes with at least one of the first to nth light-emitting element strings except the jth light-emitting element string lit, the setter sets the target value for the output voltage in the second mode based on the target value for the output voltage immediately before the first time point. (A second configuration.)

In the light-emitting element driving device of the second configuration described above, the setter may be configured such that, when the first time point comes with at least one of the first to nth light-emitting element strings except the jth light-emitting element string lit, the setter sets the target value for the output voltage in the second mode at a value resulting from adding a first constant value to the target value for the output voltage immediately before the first time point. (A third configuration.)

In the light-emitting element driving device of any of the first to third configuration described above, there may be further provided a sample-and-hold circuit configured to sample and hold the output voltage with at least one of the first to nth light-emitting element strings lit, and the setter may be configured such that, when the first time point comes with none of the first to nth light-emitting element strings lit, the setter sets the target value for the output voltage in the second mode based on an output of the sample-and-hold circuit. (A fourth configuration.)

In the light-emitting element driving device of the fourth configuration described above, the setter may be configured such that, when the first time point comes with none of the first to nth light-emitting element strings lit, the setter sets the target value for the output voltage in the second mode at a value resulting from adding a second constant value to the output of the sample-and-hold circuit. (A fifth configuration.)

In the light-emitting element driving device of the fourth or fifth configuration described above, the sample-and-hold circuit may be configured to sample the output voltage at the time point at which at least one of first to nth dimming signals switches from indicating lighting to indicating extinction. (A sixth configuration.)

In the light-emitting element driving device of the fourth or fifth configuration described above, the sample-and-hold circuit may be configured to sample the output voltage at the time point at which all of the first to nth dimming signals have switched to indicating extinction. (A seventh configuration.)

In the light-emitting element driving device of any of the first to seventh configuration described above, the power supply circuit may include a switching element and a switching controller configured to control the switching element, the light-emitting element driving device may include the switching controller, and the switching controller may be configured to perform hysteresis control based on an output of the setter. (An eighth configuration.)

According to another aspect of what is disclosed herein, a light-emitting device includes: the light-emitting element driving device of any of the first to eighth configurations described above; and the first to nth light-emitting element strings. (A ninth configuration.)

According to yet another aspect of what is disclosed herein, a vehicle includes the light-emitting device of the ninth configuration described above. (A tenth configuration.)

Advantageous Effects of Invention

According to what is disclosed herein, it is possible to provide a light-emitting element driving device that can operate with reduced heat generation and that in addition can prevent a light-emitting element from failing to be lit due to its being fed with an insufficient voltage

DESCRIPTION OF EMBODIMENTS

<One Configuration Example of a Light-Emitting Device>

Figure 1:
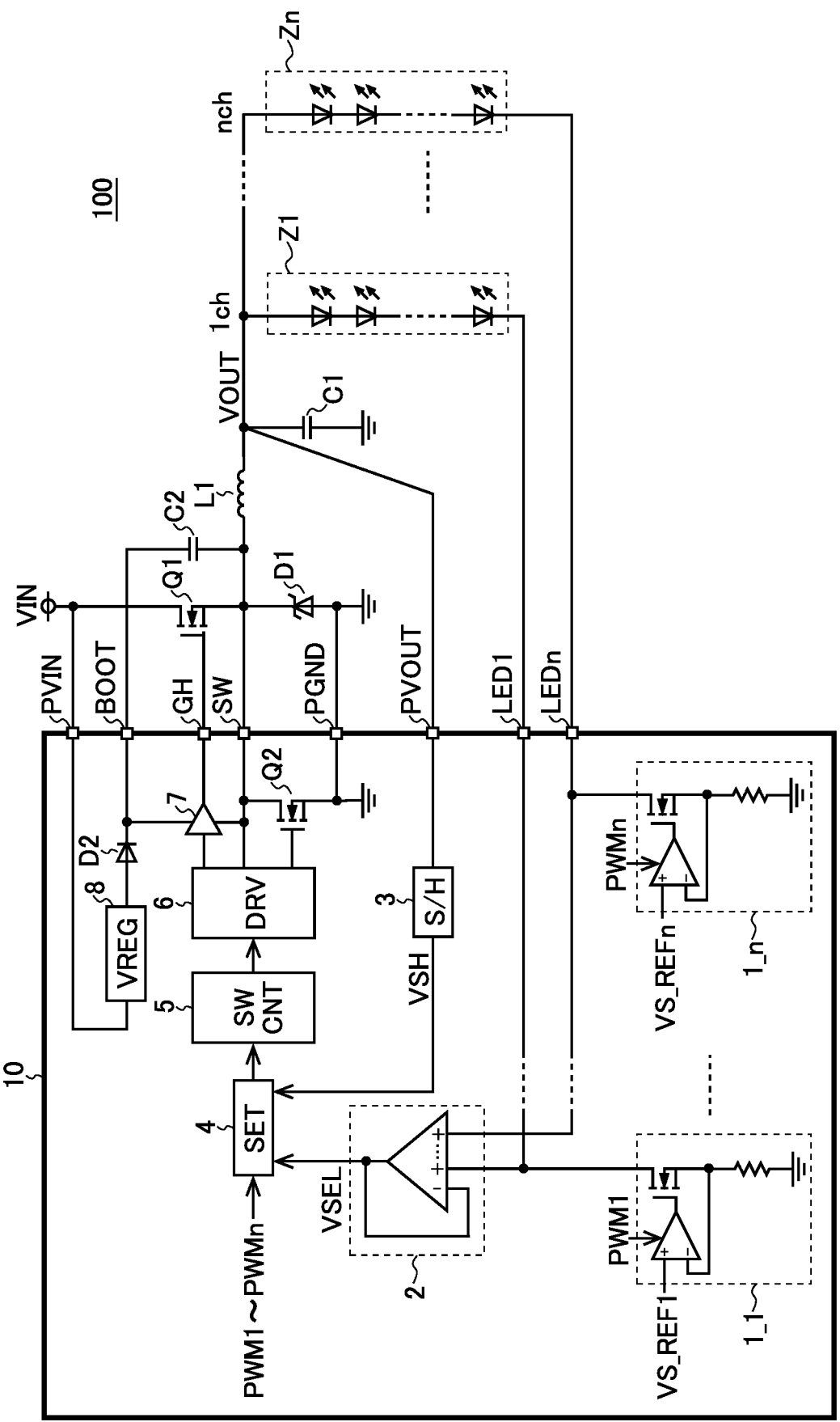
FIG. 1 is a diagram showing one configuration example of a light-emitting device.

FIG. 1 is a diagram showing one configuration example of a light-emitting device. The light-emitting device 100 shown in FIG. 1 includes an LED driving device 10, a switching element Q1, a Zener diode D1, an inductor L1, capacitors C1 and C2, and n LED strings Z1 to Zn, where n is a natural number of 2 or more.

In the configuration example under discussion, NMOS-FETs are used as the switching element Q1 and as a switching device Q2, which will be described later. The LED strings Z1 to Zn each comprise at least one LED.

The LED driving device 10 is a semiconductor integrated circuit device (what is called an LED driver IC) that drives the LED strings Z1 to Zn. The LED driving device 10 has, as external terminals for establishing electrical connection with outside the device, a terminal PVIN, a terminal BOOT, a terminal GH, a terminal SW, a terminal PGND, a terminal PVOUT, and terminals LED1 to LEDn.

The terminal PVIN is fed with an input voltage VIN. The input voltage VIN is fed also to the drain of the switching element Q1.

The terminal BOOT is connected to one terminal of the capacitor C2. The terminal GH is connected to the gate of the switching element Q1. The terminal SW is connected to the source of the switching element Q1, to the cathode of the Zener diode D1, to the other terminal of the capacitor C2, and to one terminal of the inductor L1. The terminal PGND is connected to the anode of the Zener diode D1 and to a ground potential.

The terminal PVOUT is connected to the other terminal of the inductor L1, to one terminal of the capacitor C1, and to the respective anodes of the LED strings Z1 to Zn. The other terminal of the capacitor C1 is connected to the ground potential.

The terminals LED1 to LEDn are connected to the respective cathodes of the corresponding LED strings Z1 to Zn. For example, the terminal LED1 is connected to the cathode of the LED string Z1, and the terminal LED2 (not shown in FIG. 1) is connected to the cathode of the LED string Z2 (not shown in FIG. 1).

Through complementary switching of the switching element Q1 and the switching device Q2, which will be described later, the input voltage VIN is converted to an output voltage VOUT, which is supplied to the respective anodes of the LED strings Z1 to Zn.

<Internal Configuration of the LED Driving Device>

Next, the internal configuration of the LED driving device 10 will be described. The LED driving device 10 includes n constant current sources 1_1 to 1_n, a selector 2, a sample-and-hold circuit 3, a setter 4, a switching controller 5, drivers 6 and 7, a constant voltage circuit 8, a diode D2, and a switching device Q2.

The constant current sources 1_1 to 1_n are connected to the corresponding terminals LED1 to LEDn respectively. For example, the constant current source 1_1 is connected to the terminal LED1. The constant current source 1_1 is connected via the terminal LED1 to the cathode of the LED string Z1. For another example, the constant current source 1_2 (not shown in FIG. 1) is connected to the terminal LED2 (not shown in FIG. 1). The constant current source 1_2 (not shown in FIG. 1) is connected via the terminal LED2 (not shown in FIG. 1) to the cathode of the LED string Z2 (not shown in FIG. 1).

The constant current source 1_1 is turned on and off with a delay from a dimming signal PWM1. The dimming signal PWM1 is a PWM signal, and is a signal that indicates lighting of the LED string Z1 when the on-duty is other than 0% and that indicates extinction of the LED string Z1 when the on-duty is 0%. The higher the on-duty of the dimming signal PWM1, the brighter the LED string Z1 is lit. With a delay from the time point at which the on-duty of the dimming signal PWM1 switches from 0% to other than 0%, the constant current source 1_1 is switched from off to on; with a delay from the time point at which the on-duty of the dimming signal PWM1 switches from other than 0% to 0%, the constant current source 1_1 is switched from on to off. In the configuration example shown in FIG. 1, an operational amplifier within the constant current source 1_1 has a delay producing function; instead of giving the operational amplifier a delay producing function, a delay circuit may be provided separately from the operational amplifier.

When on, the constant current source 1_1 feeds the LED string Z1 with, as a sink current, a constant current with a value commensurate with a reference voltage VS_REF1.

The constant current sources 1_2 to 1_n can be described similarly to the constant current source 1_1, and the dimming signals PWM2 to PWMn can be described similarly to the dimming signal PWM1. The dimming signals PWM1 to PWMn may be generated within the LED driving device 10, or may be fed to the LED driving device 10 from a device separate from it. In a case where the dimming signals PWM1 to PWMn are fed to the LED driving device 10 from a device separate from it, the LED driving device 10 can be provided with terminals for receiving the dimming signals PWM1 to PWMn.

Reference voltages VS_REF1 to VS_REFn may all have an equal value, or may have different values, or some of them may have an equal value. The reference voltages VS_REF1 to VS_REFn may be generated within the LED driving device 10, or may be fed to the LED driving device 10 from a device separate from it. In a case where the reference voltages VS_REF1 to VS_REFn are fed to the LED driving device 10 from a device separate from it, the LED driving device 10 can be provided with terminals for receiving the reference voltages VS_REF1 to VS_REFn.

The selector 2 selects, among the respective cathode voltages of the LED strings Z1 to Zn, the lowest voltage and outputs it. In the configuration example under discussion, used as the selector 2 is a voltage follower circuit to which the output terminal and the inverting input terminal of an operational amplifier are connected. The operational amplifier has n non-inverting input terminals, and outputs a voltage VSEL commensurate with the difference between the lowest voltage among the respective voltages fed to those non-inverting input terminals and the voltage fed to the inverting input terminal. The non-inverting input terminals of the operational amplifier are connected to the terminals LED1 to LEDn respectively, The sample-and-hold circuit 3 is connected to the terminal PVOUT; it samples and holds the output voltage VOUT fed to the terminal PVOUT, and outputs the held voltage VSH.

The setter 4 sets a target value for the output voltage VOUT. The setter 4 has a first mode and a second mode. In the first mode, the setter 4 sets the target value for the output voltage VOUT such that the lowest voltage among the respective cathode voltages of the LED strings Z1 to Zn equals a predetermined value "a". In the second mode, the setter 4 sets the target value for the output voltage VOUT at a value at which the LED string Zj (where j is a natural number of n or less) can be lit during the period from a first time point at which the dimming signal PWMj switches from indicating extinction of the LED string Zj to indicating its lighting to a second time point at which the constant current source 1_j switches from off to on.

The switching controller 5 controls the switching of the switching elements Q1 and Q2 based on the target value for the output voltage VOUT set by the setter 4.

The drivers 6 and 7 generate a gate signal G1 for the switching element Q1 based on the output of the switching controller 5, and feeds the gate signal G1 to the terminal GH. The driver 7 uses as a positive-side supply voltage a boot voltage that is fed to the terminal BOOT, and uses as a negative-side supply voltage a switching voltage that is fed to the terminal SW.

The boot voltage fed to the terminal BOOT is generated by a bootstrap circuit that is constituted by the capacitor C2, the constant voltage circuit 8 which generates a constant voltage VREG from the input voltage VIN fed to the input voltage VIN, and the diode D2 of which the anode is connected to the output of the constant voltage circuit 8 and of which the cathode is connected to the terminal BOOT.

The driver 6 generates a gate signal G2 for the switching device Q2 based on the output of the switching controller 5, and feeds the gate signal G2 to the gate of the switching device Q2.

<Operation of the LED Driving Device>

A description will now be given of the behavior observed when, with at least one of the LED strings Z1 to Zn except the LED string Zj lit, the dimming signal PWMj switches from indicating extinction of the LED string Zj to indicating its lighting (hereinafter referred to as the first case).

Figure 2:
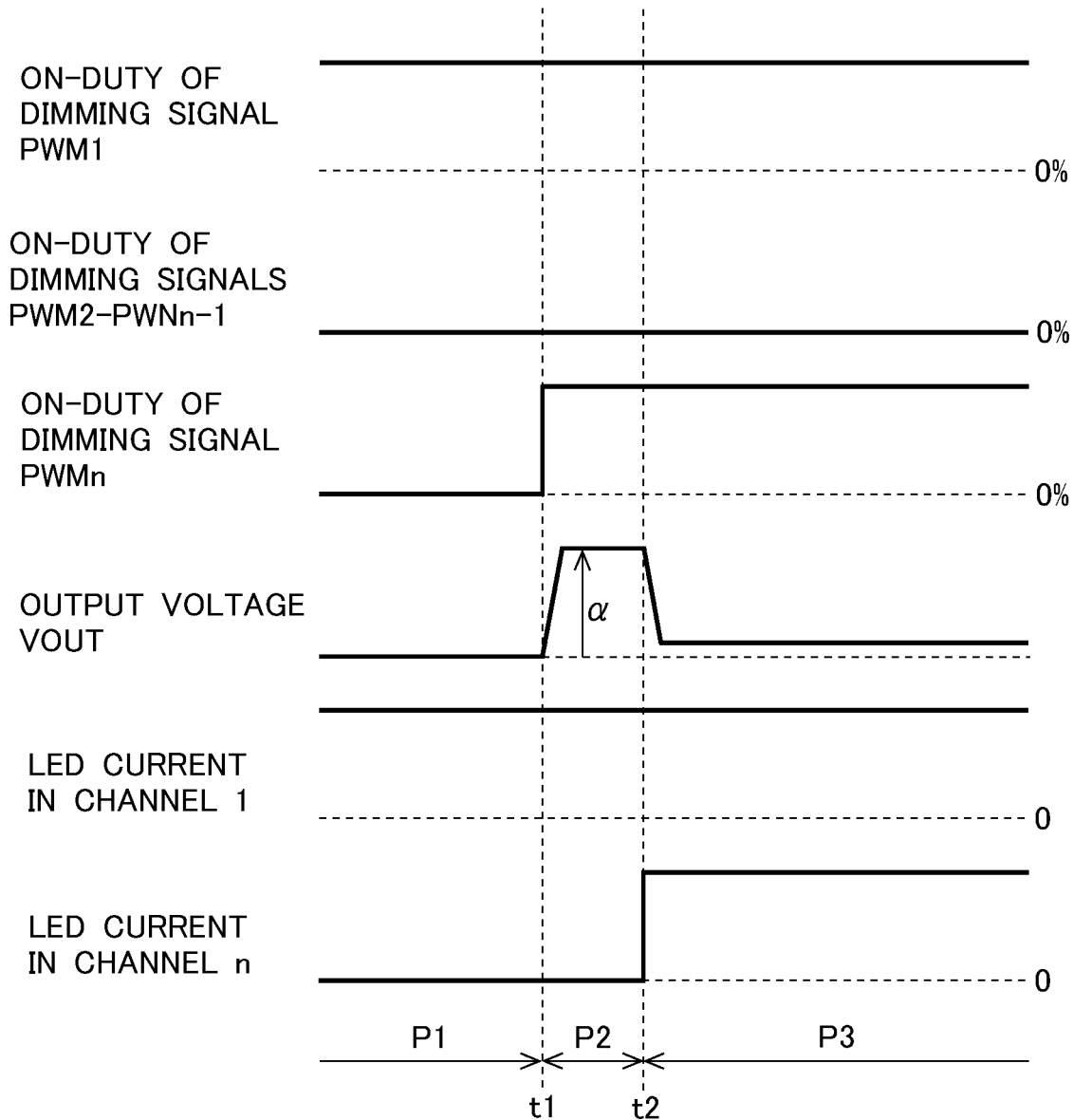
FIG. 2 is a timing chart of on-duties of dimming signals, an output voltage, and LED currents.

As one example of the first case, with reference to FIG. 2, a description will be given of a case where, with the LED string Z1 alone lit, the dimming signal PWMn switches from indicating extinction of the LED string Zn to indicating its lighting. It should be noted that in FIG. 2, and also in FIGS. 3 to 5, which will be referred later, the output voltage VOUT is depicted as it is observed when the forward voltage across the LED string Zn is higher than the forward voltage across the LED string Z1.

During the period P1 in which the LED string Z1 alone is lit, the selector 2 selects the cathode voltage of the LED string Z1 and the setter 4 sets the target value for the output voltage VOUT such that the cathode voltage of the LED string Z1 equals the perspective view "a".

During the period P2 from the time point t1 at which, with the LED string Z1 alone lit, the dimming signal PWMn switches from indicating extinction of the LED string Zn to indicating its lighting to the time point t2 at which the constant current source 1_n switches from off to on, the setter 4 sets the target value for the output voltage VOUT at a value at which any of the LED strings Z1 to Zn can be lit. Here, used as the value at which any of the LED strings Z1 to Zn can be lit is the value resulting from adding an up-offset "a" to the target value of the output voltage VOUT during the period P1. The up-offset "a" can be, for example, a value resulting from, with consideration given to the forward-voltage variations and temperature characteristics of the LED strings Z1 to Zn, subtracting the lowest from the highest of the forward voltages expected among the LED strings.

During the period P2, the output voltage VOUT becomes sufficiently high; thus, when the constant current source 1_n switches from off to on and the transition from the period P2 to a period P3 takes place, a current passes through the LED string Zn, which is thus lit.

During the period P3 in which LED strings Z1 and Zn alone are lit, the selector 2 selects the cathode voltage of the LED string Zn and the setter 4 sets the target value for the output voltage VOUT such that the cathode voltage of the LED string Zn equals the predetermined value "a".

Through the operation described above, it is possible to reduce heat generation during the periods P1 and P3, and in addition to prevent the LED string Zn from failing to be lit due to its being fed with an insufficient voltage.

Next, a description will be given of a case where, with none of the LED strings Z1 to Zn lit, the dimming signal PWMj switches from indicating extinction of the LED string Zj to indicating its lighting (hereinafter referred to as the second case).

Figure 3:
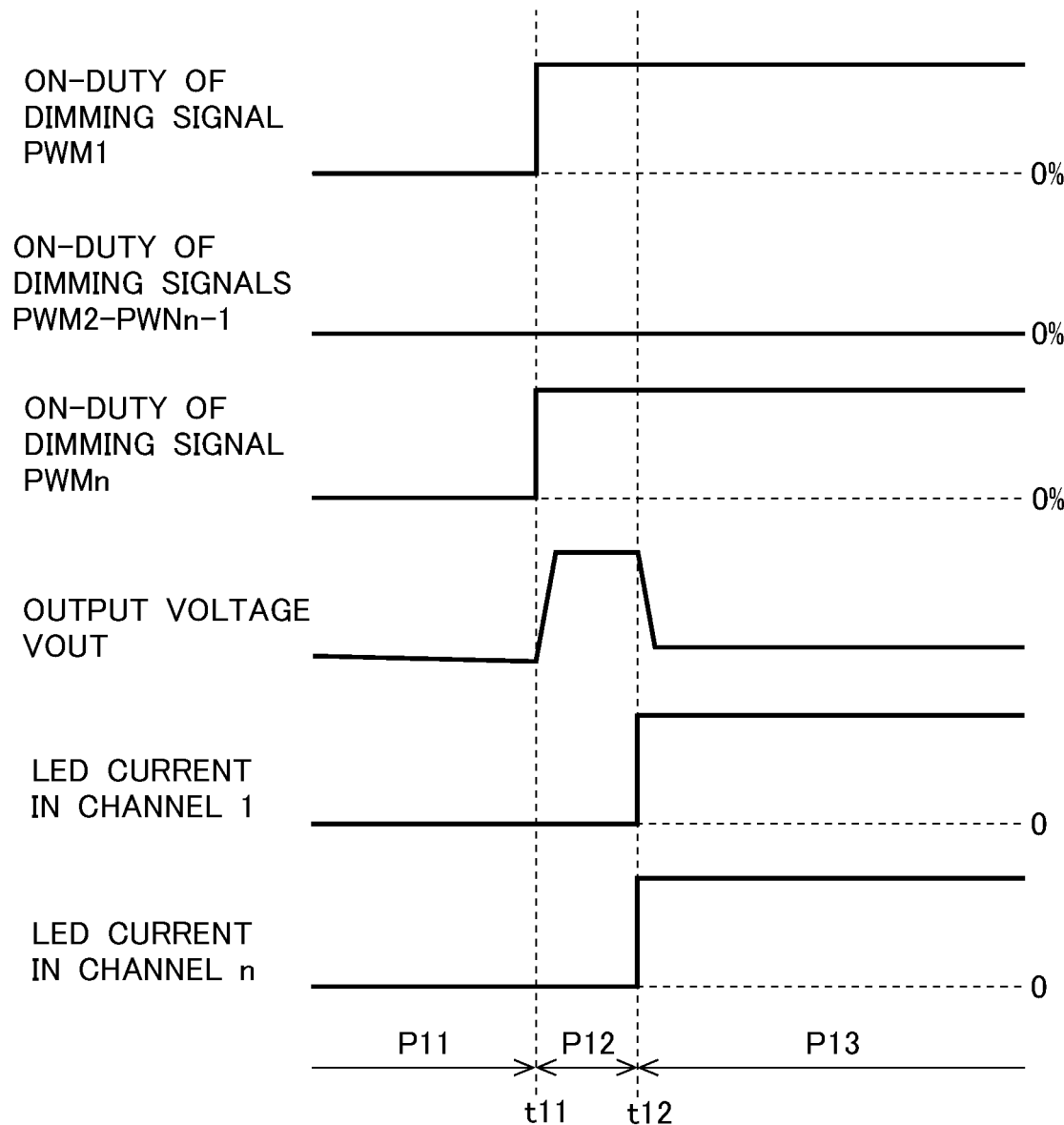
FIG. 3 is a timing chart of on-duties of dimming signals, an output voltage, and LED currents.

As one example of the second case, with reference to FIG. 3, a description will be given of a case where, with none of the LED strings Z1 to Zn lit, the dimming signal PWM1 switches from indicating extinction of the LED string Z1 to indicating its lighting and in addition the dimming signal PWMn switches from indicating extinction of the LED string Zn to indicating its lighting.

In the period P11 in which none of the LED strings Z1 to Zn is lit, the output of the selector 2 is indefinite and accordingly the target value for the output voltage VOUT is indefinite; this keeps the switching of the switching elements Q1 and Q2 halted and keeps the switching elements Q1 and Q2 off. Thus, during period P11, as the capacitor C1 discharges naturally, the output voltage VOUT decreases gradually.

During the period P12 from the time point t11 at which, with none of the LED strings Z1 to Zn lit, the dimming signal PWM1 switches from indicating extinction of the LED string Z1 to indicating its lighting and in addition the dimming signal PWMn switches from indicating extinction of the LED string Zn to indicating its lighting to the time point t12 at which the constant current sources 1_1 and 1_n switch from off to on, the setter 4 sets the target value for the output voltage VOUT at a value at which any of the LED strings Z1 to Zn can be lit. Here used as the value at which any of the LED strings Z1 to Zn can be lit is, for example, a value resulting from adding an up-offset "a" to the output voltage VOUT sampled and held by the sample-and-hold circuit 3 while a current is passing through at least one of the LED strings Z1 to Zn. As in the first case described above, the first up-offset "a" can be, for example, a value resulting from, with consideration given to the forward-voltage variations and temperature characteristics of the LED strings Z1 to Zn, subtracting the lowest from the highest of the forward voltages expected among the LED strings.

During the period P12, the output voltage VOUT becomes sufficiently high; thus, when the constant current sources 1_1 and 1_n switch from off to on and the transition from the period P12 to a period P13 takes place, a current passes through the LED strings Z1 and Ln, which are thus lit.

During the period P13 in which the LED strings Z1 and Zn alone are lit, the selector 2 selects the cathode voltage of the LED string Zn and the setter 4 sets the target value for the output voltage VOUT such that the cathode voltage of the LED string Zn equals the predetermined value "a".

Through the operation described above, it is possible to reduce heat generation in the periods P11 and P13, and in addition to prevent the LED strings Z1 and Zn from failing to be lit due to their being fed with an insufficient voltage.

Figure 4:
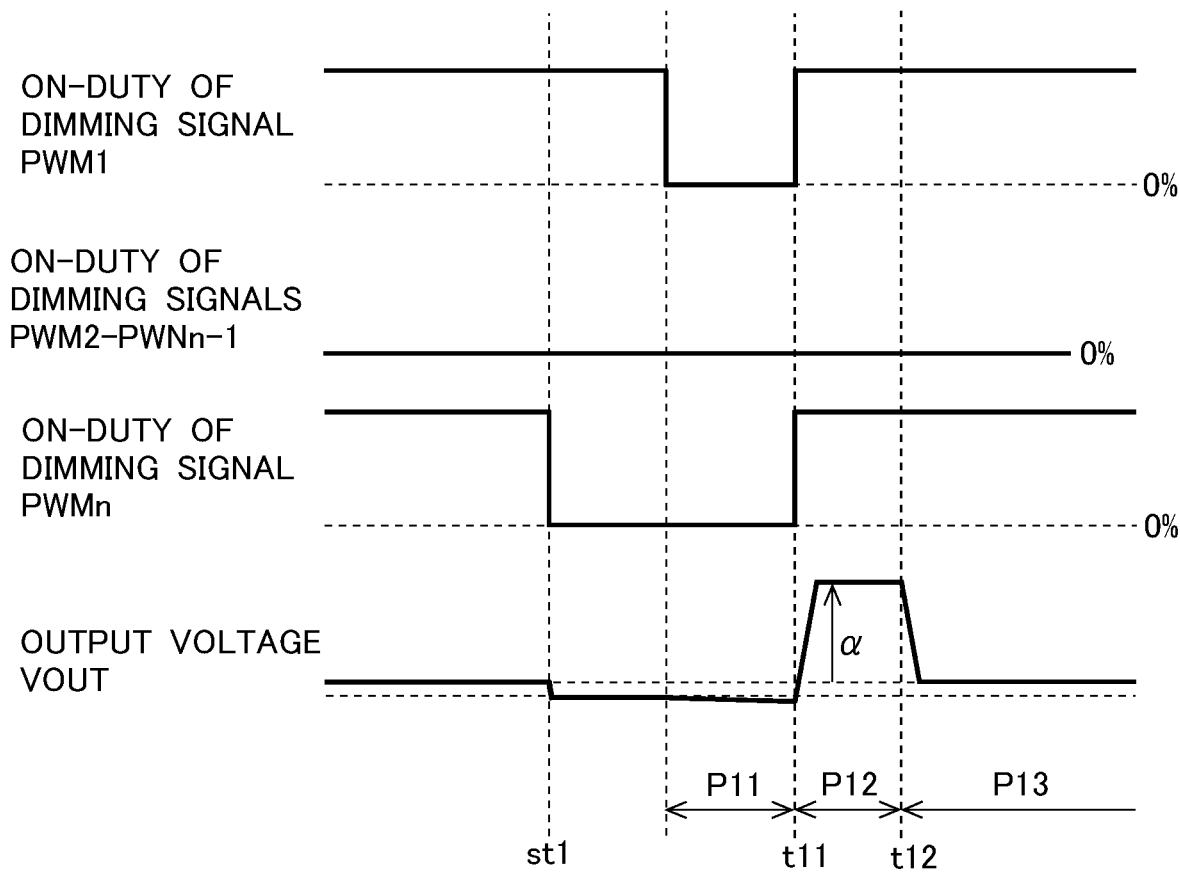
FIG. 4 is a timing chart of on-duties of dimming signals and an output voltage.
Figure 5:
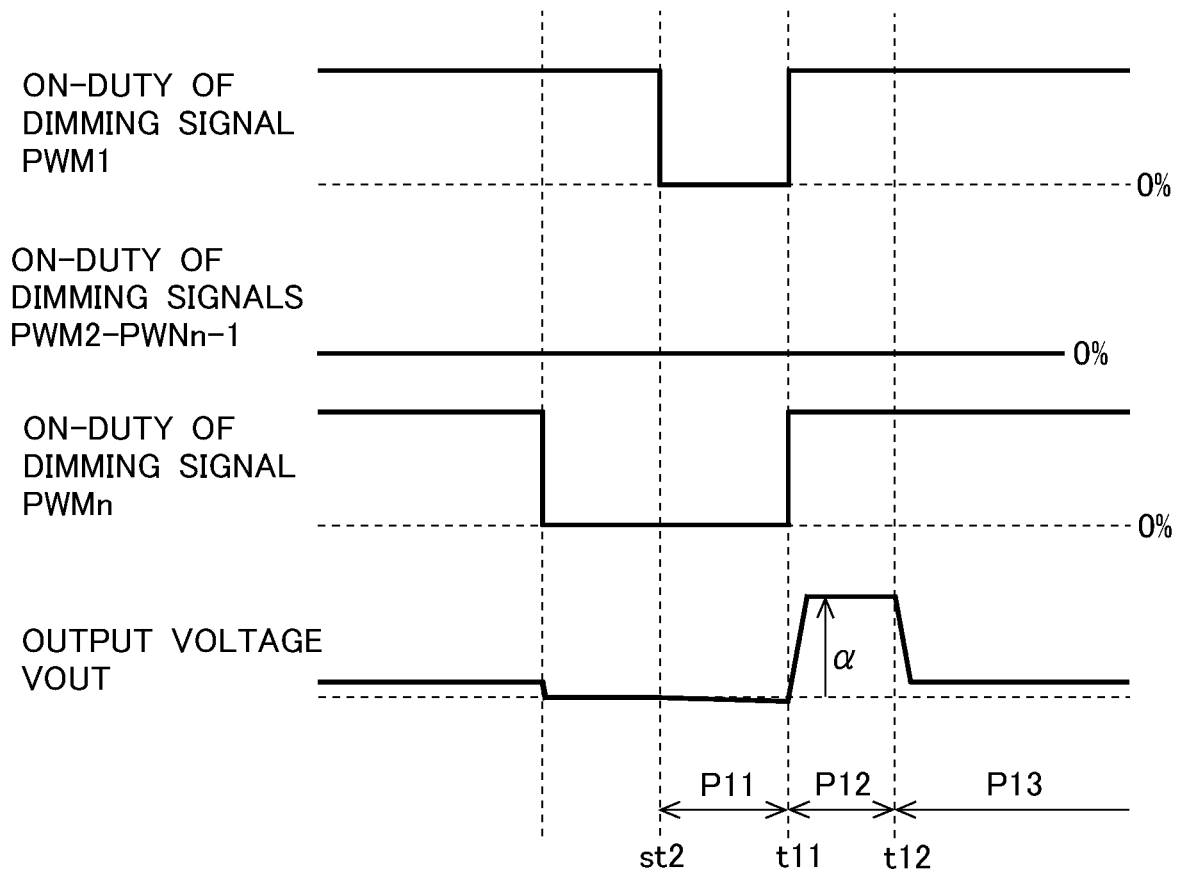
FIG. 5 is a timing chart of on-duties of dimming signals and an output voltage.

The sample-and-hold circuit 3 can sample the output voltage VOUT, for example, at a time point st1 as shown in FIG. 4 at which one of the dimming signals PWM1 to PWMn (in FIG. 4, the dimming signal PWMn) switches from indicating lighting to indicating extinction, or at a time point st2 as shown in FIG. 5 at which all of the dimming signals PWM1 to PWMn have switched to indicating extinction, or the like. In a configuration where the sample-and-hold circuit 3 samples the output voltage VOUT at the time point st1 or st2, the time point of the sampling by the sample-and-hold circuit 3 can be determined based on the dimming signals PWM1 to PWMn. This helps simplify the control of the operation of the sample-and-hold circuit 3.

<One Configuration Example of the Setter and the Switching Controller>

In an early stage of each of the periods P3 and P13 mentioned above, until the output voltage VOUT falls to the target value, the constant current sources 1_1 and 1_n are subject to high heat generation. A configuration in which the switching controller 5 performs hysteresis control based on the output of the setter 4 permits faster response of the output voltage VOUT; it is thus possible to reduce heat generation in the constant current sources 1_1 and 1_n in an early stage of the periods P3 and P13 mentioned above.

Figure 6:
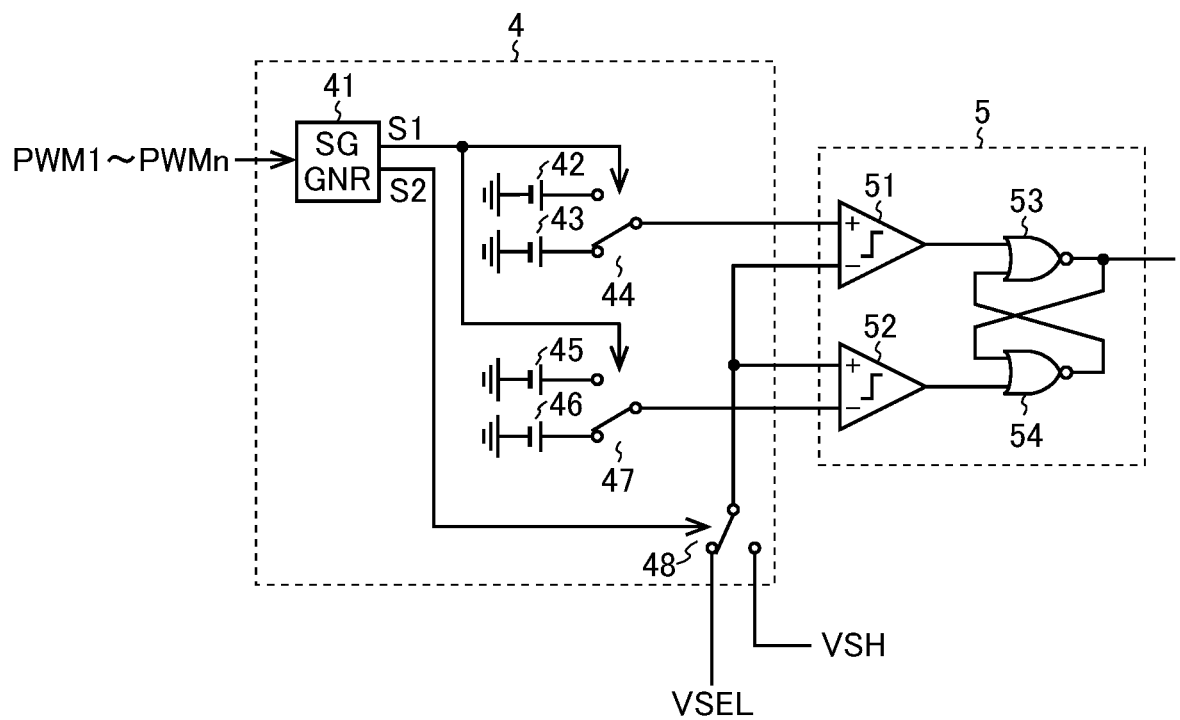
FIG. 6 is a diagram showing one configuration example of a setter and a switching controller.

One configuration example of the setter 4 and the switching controller 5 in which the switching controller 5 performs hysteresis control based on the output of the setter 4 is shown in FIG. 6.

In the configuration example shown in FIG. 6, the setter 4 includes a signal generator 41, constant voltage sources 42, 43, 45, and 46, and switches 44, 47, and 48. The switching controller 51 includes comparators 51 and 52 and NOR gates 53 and 54.

The signal generator 41 generates signals Si and S2 based on the dimming signals PWM1 to PWMn.

The signal S1 is at high level during the period from a first time point at which the dimming signal PWMj switches from indicating extinction of the LED string Zj to indicating its lighting to a second time point at which the constant current source 1_j switches from off to on, and is otherwise at low level.

The signal S2 is at high level, if the above-mentioned first time point comes with none of the LED strings Z1 to Zn lit, during the period from the first time point to the second time point, and is otherwise at low level.

When the signal Si is at high level, the switch 44 selects the constant voltage source 43 so that the constant voltage source 43 conducts to the non-inverting input terminal of the comparator 51, and the switch 47 selects the constant voltage source 46 so that the constant voltage source 46 conducts to the inverting input terminal of the comparator 52. The output voltage of the constant voltage source 43 and the output voltage of the constant voltage source 46 are voltages that determine the up-offset "a" mentioned above.

On the other hand, when the signal S1 is at low level, switch 44 selects the constant voltage source 42 so that the constant voltage source 42 conducts to the non-inverting input terminal of the comparator 51, and the switch 47 selects the constant voltage source 45 so that the constant voltage source 45 conducts to the inverting input terminal of the comparator 52. The output voltage of the constant voltage source 42 and the output voltage of the constant voltage source 45 are voltages that determine the predetermined value "a" mentioned above.

When the signal S2 is at high level, the switch 48 selects the sample-and-hold circuit 3 so that the sample-and-hold circuit 3 conducts to the inverting input terminal of the comparator 51 and to the non-inverting input terminal of the comparator 52.

On the other hand, when the signal S2 is at low level, the switch 48 selects the selector 2 so that the selector 2 conducts to the inverting input terminal of the comparator 51 and to the non-inverting input terminal of the comparator 52.

The NOR gates 53 and 54 constitute a NOR-type SR latch circuit, the output signal of the comparator 51 serving as the reset signal for the NOR-type SR latch circuit and the output signal of the comparator 52 serving as the set signal for the NOR-type SR latch circuit.

<Applications>

Figure 7A:
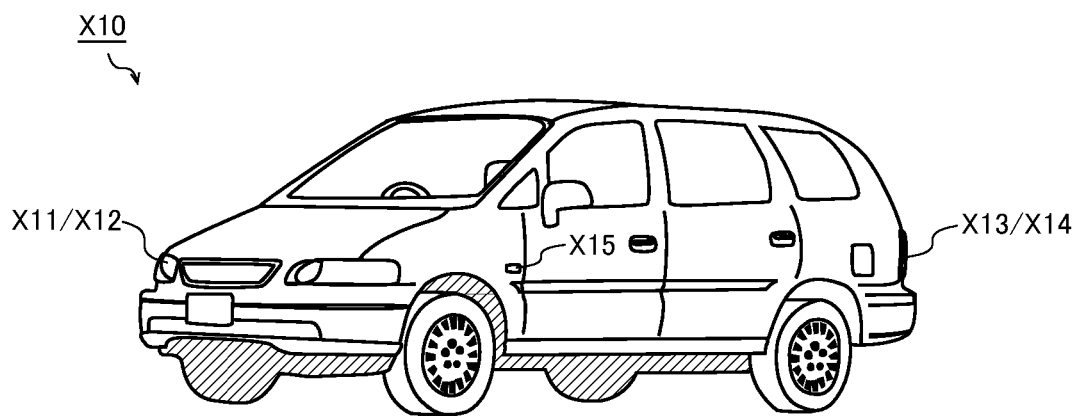
FIG. 7A is an exterior view of a vehicle (front view)
Figure 7B:
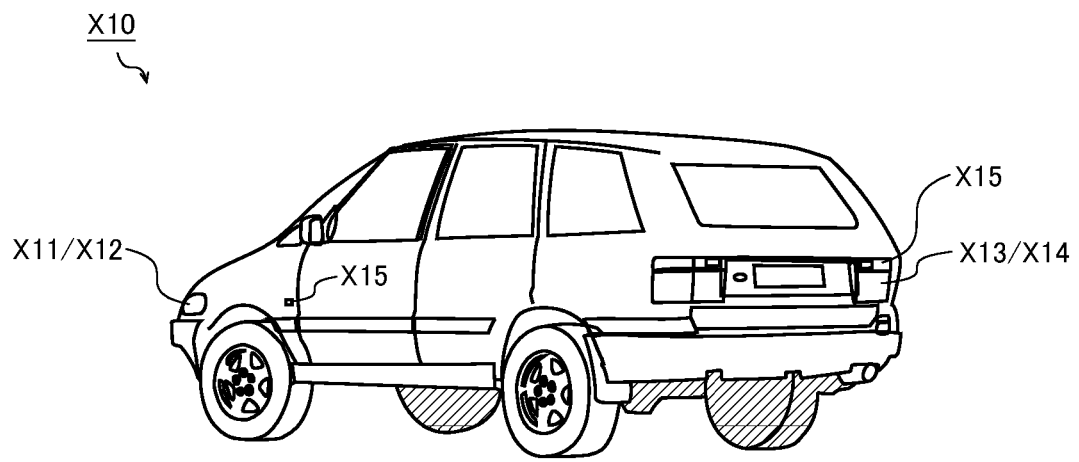
FIG. 7B is an exterior view of a vehicle (rear view)
Figure 8:
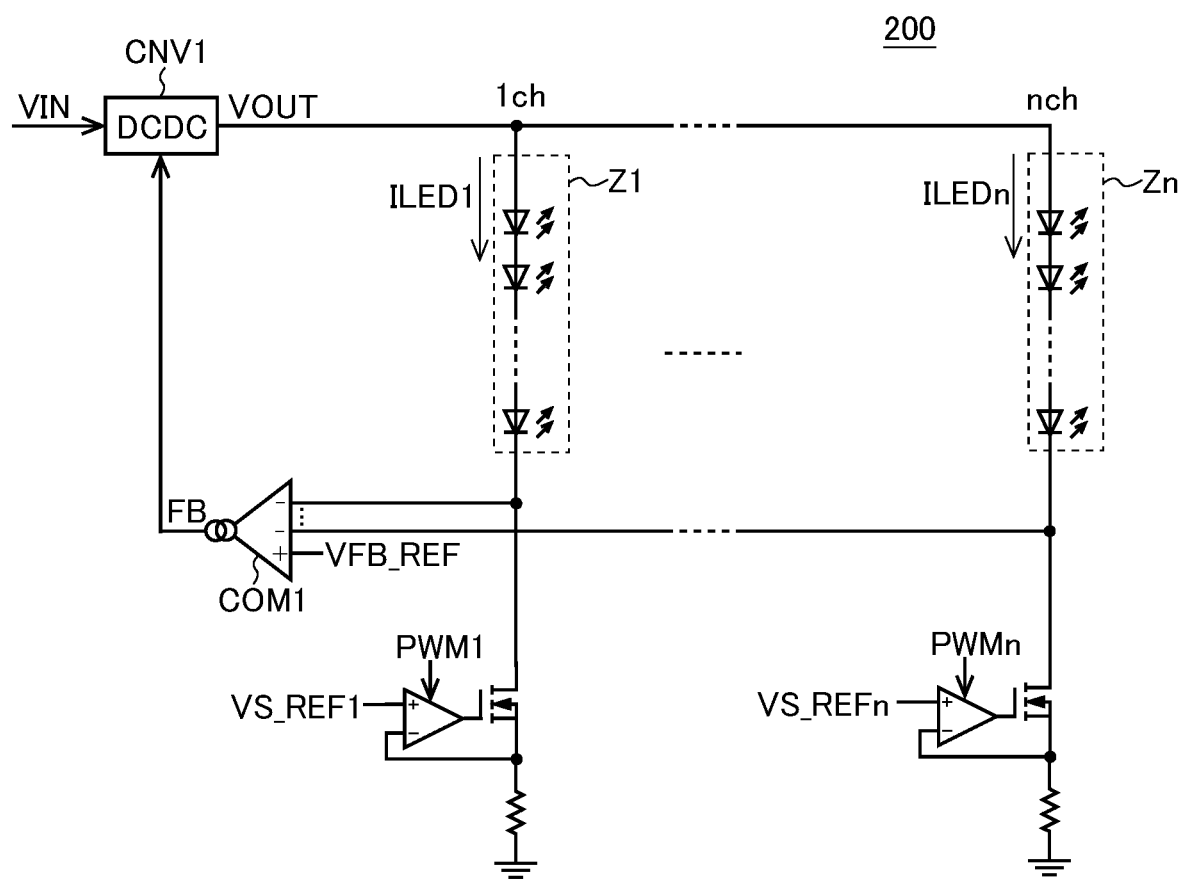
FIG. 8 is a diagram showing one example of a light-emitting device that includes a LED driving device.

For example as shown in FIGS. 7A and 7B, the light-emitting device 100 described above can be used suitably on a vehicle X10, as a headlamp (including a high-beam lamp, a low-beam lamp, a small lamp, a fog lamp, or the like as necessary) X11, a light source X12 for a daylight running light (DRL), a taillamp (including a small lamp, a rear lamp, or the like as necessary) X13, a stop lamp X14, a turn lamp X15, or the like. For example, in a case where the just-mentioned vehicle-mounted lamp has illumination capabilities, using the light-emitting device 100 makes it possible to prevent diversion from the desired state of lighting.

The light-emitting device 100 described above can be used also as a backlight in a display device. For example, in a case where the just-mentioned display device is capable of local dimming control, using the light-emitting device 100 as a backlight makes it possible to prevent diversion from the desired state of lighting.

<Modifications>

As a modification from the embodiment described above, a constant value may be used as the value at which any of the LED strings Z1 to Zn can be lit. In that case, during the periods P2 and P2 mentioned above, the target value for the output voltage VOUT is similar to that in known constant-voltage LED driving devices.

While the embodiment described above deals with, as an example, a configuration where LEDs are used as light-emitting elements, this is not meant as any limitation: instead, for example, organic EL elements may be used as light-emitting elements.

While the embodiment described above deals with a configuration where the cathode of the LED string Zi (where i is an integer of n or less) is connected via the terminal LED1 to the anode of the constant current source 1_i, this may be reversed: the anode of the LED string Zi may be connected to the cathode of the constant current source 1_i. In a light-emitting device with a configuration where the anode of the LED string Zi is connected to the cathode of the constant current source 1_i, the selector 2 can select and output the highest voltage among the respective anode voltages of the LED strings Zi.

The various technical features disclosed herein may be implemented in any other manner than as in the embodiments described above, and allow for many modifications without departing from the spirit of the present invention. That is, the embodiments descried above should be understood to be in every aspect illustrative and not restrictive.

The technical scope of the present invention is defined not by the description of the embodiments given above but by the appended claims, and should be understood to encompass any modifications made in a sense and scope equivalent to the claims.

REFERENCE SIGNS LIST

1_1 to 1_n constant current source
2 selector
3 sample-and-hold circuit
4 setter
5 switching controller
6, 7 driver
8 constant voltage circuit
10 LED driving device
100 light-emitting device
C1, C2 capacitor
D1 Zener diode
D2 diode
L1 inductor
Q1, Q2 switching element
Z1 to Zn LED string

The invention claimed is:

1. A light-emitting element driving device comprising:
a setter configured to set a target value for an output voltage that is supplied from a power supply circuit configured to covert an input voltage to the output voltage to respective anodes of first to nth series circuits (where n is a natural number of 2 or more); and
first to nth constant current sources,
wherein
the ith series circuit (where i is a natural number of n or less) is a series circuit composed of an ith light-emitting element string and the ith constant current source,
the ith constant current source is configured to be turned on and off with a delay from an ith dimming signal indicating either lighting or extinction of the ith light-emitting element string, and
the setter is configured to have:
a first mode in which the setter sets the target value for the output voltage such that,
in a configuration where a cathode of the ith light-emitting element string is connectable to an anode of the ith constant current source, a lowest voltage among respective cathode voltages of the first to nth light-emitting element strings equals a predetermined value and
in a configuration where an anode of the ith light-emitting element string is connectable to a cathode of the ith constant current source, a highest voltage among respective anode voltages of the first to nth light-emitting element strings equals a predetermined value; and
a second mode in which the setter sets the target value for the output voltage at a value at which the jth light-emitting element string (where j is a natural number of n of less) can be lit during a period from a first time point at which a jth dimming signal switches from indicating extinction of the jth light-emitting element string to indicating lighting thereof to a second time point at which the jth constant current source switches from off to on.

2. The light-emitting element driving device according to claim 1, wherein
the setter is configured such that, when the first time point comes with at least one of the first to nth light-emitting element strings except the jth light-emitting element string lit, the setter sets the target value for the output voltage in the second mode based on the target value for the output voltage immediately before the first time point.

3. The light-emitting element driving device according to claim 2, wherein
the setter is configured such that, when the first time point comes with at least one of the first to nth light-emitting element strings except the jth light-emitting element string lit, the setter sets the target value for the output voltage in the second mode at a value resulting from adding a first constant value to the target value for the output voltage immediately before the first time point.

4. The light-emitting element driving device according to claim 1, further comprising:
a sample-and-hold circuit configured to sample and hold the output voltage with at least one of the first to nth light-emitting element strings lit,
wherein
the setter is configured such that, when the first time point comes with none of the first to nth light-emitting element strings lit, the setter sets the target value for the output voltage in the second mode based on an output of the sample-and-hold circuit.

5. The light-emitting element driving device according to claim 4, wherein
the setter is configured such that, when the first time point comes with none of the first to nth light-emitting element strings lit, the setter sets the target value for the output voltage in the second mode at a value resulting from adding a second constant value to the output of the sample-and-hold circuit.

6. The light-emitting element driving device according to claim 4, wherein
the sample-and-hold circuit is configured to sample the output voltage at a time point at which at least one of first to nth dimming signals switches from indicating lighting to indicating extinction.

7. The light-emitting element driving device according to claim 4, wherein
the sample-and-hold circuit is configured to sample the output voltage at a time point at which all of the first to nth dimming signals have switched to indicating extinction.

8. The light-emitting element driving device according to claim 1, wherein
the power supply circuit includes a switching element and a switching controller configured to control the switching element,
the light-emitting element driving device includes the switching controller, and
the switching controller is configured to perform hysteresis control based on an output of the setter.

9. A light-emitting device comprising:
the light-emitting element driving device according to claim 1; and
the first to nth light-emitting element strings.

10. A vehicle comprising the light-emitting device according to claim 9.

* * * * *